US012313223B2

(12) United States Patent
Jeong et al.

(10) Patent No.: US 12,313,223 B2
(45) Date of Patent: May 27, 2025

(54) CRYOGENIC LIQUID STORAGE APPARATUS

(71) Applicants: Hyundai Motor Company, Seoul (KR); Kia Corporation, Seoul (KR); Korea Advanced Institute of Science and Technology, Daejeon (KR)

(72) Inventors: Kwi Seong Jeong, Yongin-si (KR); Se Kwon Jung, Seoul (KR); Dae Jun Chang, Daejeon (KR); Hyun Jun Park, Daejeon (KR); Se Hoon Kim, Daejeon (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 118 days.

(21) Appl. No.: 18/081,460

(22) Filed: Dec. 14, 2022

(65) Prior Publication Data

US 2024/0035622 A1 Feb. 1, 2024

(30) Foreign Application Priority Data

Jul. 28, 2022 (KR) .......................... 1020220094054

(51) Int. Cl.
*F17C 3/00* (2006.01)

(52) U.S. Cl.
CPC .......... *F17C 3/00* (2013.01); *F17C 2203/016* (2013.01); *F17C 2209/228* (2013.01);
(Continued)

(58) Field of Classification Search
CPC .......... F17C 2203/016; F17C 2203/014; F17C 2203/018; F17C 3/00; F17C 2221/012; F17C 2223/0161; F17C 13/00; F17C 2270/0105; F17C 2270/0178; F17C 2270/0189; F17C 2270/0763; F17C 3/085;
(Continued)

(56) References Cited

U.S. PATENT DOCUMENTS 7,757,882 B2 7/2010 Immel et al.
8,028,853 B2 10/2011 Hobbs et al.
(Continued)

FOREIGN PATENT DOCUMENTS

CN 105526494 B 6/2018
JP H0317385 B 3/1991
(Continued)

OTHER PUBLICATIONS

English Machine Translation of WO-2023217461-A1 (Year: 2023).*
English Machine Translation of WO-2012028651-A1 (Year: 2012).*

*Primary Examiner* — Don M Anderson
*Assistant Examiner* — Laura E. Parker
(74) *Attorney, Agent, or Firm* — Fish & Richardson P.C.

(57) ABSTRACT

A cryogenic liquid storage apparatus includes an inner container configured to store a cryogenic liquid, an inner holder disposed at the inner container, an outer container that surrounds the inner container, an outer holder disposed at the outer container, and a support wire that is a single body defining a closed-loop shape passing through the outer holder and the inner holder. The support wire is configured to support the inner container with respect to the outer container.

15 Claims, 14 Drawing Sheets

(52) U.S. Cl.
CPC .................. *F17C 2221/012* (2013.01); *F17C 2223/0161* (2013.01); *F17C 2260/013* (2013.01)

(58) Field of Classification Search
CPC ..... F17C 2203/0629; F17C 2270/0184; Y02E 60/32
USPC ....................................................... 220/560.1
See application file for complete search history.

(56) References Cited

U.S. PATENT DOCUMENTS

| | | | | |
|---|---|---|---|---|
| 9,279,540 | B2 | 3/2016 | Verhulst et al. | |
| 10,928,007 | B2 | 2/2021 | Posselt et al. | |
| 2007/0084221 | A1* | 4/2007 | Ruocco-Angari | G01J 5/061 220/560.04 |
| 2007/0228048 | A1* | 10/2007 | Immel | F17C 13/021 220/560.1 |
| 2008/0022698 | A1 | 1/2008 | Hobbs et al. | |
| 2019/0145580 | A1 | 5/2019 | Posselt et al. | |

FOREIGN PATENT DOCUMENTS

| | | | | |
|---|---|---|---|---|
| JP | 200657784 | A | 3/2006 | |
| JP | 200834846 | A | 2/2008 | |
| JP | 2019515218 | A | 6/2019 | |
| KR | 101974259 | B | 5/2019 | |
| WO | WO 2002101280 | A | 12/2002 | |
| WO | WO-2012028651 | A1 * | 3/2012 | F17C 3/022 |
| WO | WO-2023217461 | A1 * | 11/2023 | |

* cited by examiner

CRYOGENIC LIQUID STORAGE APPARATUS

CROSS-REFERENCE TO RELATED APPLICATION

This application claims priority to and the benefit of Korean Patent Application No. 10-2022-0094054, filed in the Korean Intellectual Property Office, on Jul. 28, 2022, the entire contents of which are incorporated herein by reference.

TECHNICAL FIELD

The present disclosure relates to a cryogenic liquid storage apparatus, and more particularly, to a cryogenic liquid storage apparatus capable of ensuring structural rigidity, improving safety and reliability, and minimizing the amount of heat penetration.

BACKGROUND ART

A fuel cell system refers to a system that continuously produces electrical energy by means of a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine. Further, the applications of the polymer electrolyte membrane fuel cell are expanded to various mobility vehicles in the marine and aerospace fields.

The hydrogen mobility vehicle includes a fuel cell stack that produces electricity through an oxidation-reduction reaction between hydrogen and oxygen. The hydrogen mobility vehicle is configured to travel as a motor is operated by electricity produced by the fuel cell stack.

Recently, in order to increase an energy storage density per unit volume of fuel (e.g., hydrogen) used for the fuel cell system, various attempts have been made to store liquid hydrogen in a storage container at an extremely low temperature (e.g., 20 K) and supply the fuel cell stack with the hydrogen (liquid hydrogen or gaseous hydrogen) stored in the storage container.

The storage container for storing liquid hydrogen may include an inner container configured to store hydrogen (liquid hydrogen), and an outer container configured to surround the inner container.

Meanwhile, there can be a problem in that the inner and outer containers are damaged or broken when the inner container is moved relative to the outer container because of vibration, impact, and the like applied to the storage container. For this reason, a risk of a leak of hydrogen can increase, and safety and reliability can deteriorate. Therefore, it is desirable to maximally prevent the movement of the inner container relative to the outer container.

In the related art, there has been proposed a method of disposing a plurality of support members (e.g., the support members each having a hollow tube shape and made of a plastic material) partially between the outer container and the inner container in order to prevent the movement of the inner container relative to the outer container and ensure structural rigidity (support rigidity of the inner container against the outer container).

However, in the related art, there is a problem in that only the support member partially interposed between the outer container and the inner container cannot effectively prevent the movement of the inner container relative to the outer container (particularly, upward and downward movements, leftward and rightward movements, and axial movements of the inner container relative to the outer container based on an axis of the inner container).

In addition, in the related art, the plurality of support members are independently disposed between the outer container and the inner container, which causes problems in that a structure and a manufacturing process are complicated, manufacturing efficiency is degraded, and manufacturing costs are increased.

Moreover, in the related art, a support having a tube shape and made of a plastic material has high structural strength, but the support is disadvantageous in that the amount of heat penetration (the amount of penetration of heat transferred from the outer container to the inner container) is large.

In addition, as another method of supporting the inner container with respect to the outer container, there has been proposed a method of supporting the inner container with respect to the outer container by using a wire support.

However, in the related art, the wire support cannot restrain the inner container in the directions of the six degrees of freedom (the upward and downward movements, the leftward and rightward movements, and the axial movements of the inner container relative to the outer container based on the axis of the inner container, which causes a problem in that another support is to be additionally provided.

Therefore, recently, various studies have been conducted to ensure the structural rigidity of the storage container, improve the safety and reliability, and minimize the amount of heat penetration into the inner container, but the study results are still insufficient. Accordingly, there is a need to develop, among other things, a technology to ensure the structural rigidity of the storage container, improve the safety and reliability, and minimize the amount of heat penetration into the inner container.

SUMMARY

The present disclosure has been made in an effort to provide a cryogenic liquid storage apparatus capable of ensuring structural rigidity, improving safety and reliability, and minimizing the amount of heat penetration into an inner container.

In particular, the present disclosure has been made in an effort to minimize a movement of an inner container relative to an outer container and improve structural rigidity.

Among other things, the present disclosure has been made in an effort to enable a single support wire to prevent all upward and downward movements (displacements in a Y-axis direction) of an inner container relative to an outer container, leftward and rightward movements (displacements in a Z-axis direction) of the inner container relative to the outer container, and axial movements (displacements in an X-axis direction) of the inner container relative to the outer container.

The present disclosure has also been made in an effort to simplify a structure and a manufacturing process and reduce manufacturing costs.

The present disclosure has also been made in an effort to minimize heat transferred (by conduction) from an outer container to an inner container and ensure performance in thermally insulating the inner container.

The objects to be achieved by the implementations are not limited to the above-mentioned objects, but also include objects or effects that may be understood from the solutions or implementations described below.

An exemplary implementation of the present disclosure provides a cryogenic liquid storage apparatus including: an inner container configured to store a cryogenic liquid; an inner holder disposed on the inner container; an outer container configured to surround the inner container; an outer holder disposed on the outer container; and a support wire provided as a single body having a closed-loop shape and configured to support the inner container with respect to the outer container while passing through the outer holder and the inner holder.

This is to ensure structural rigidity of the storage apparatus, improve safety and reliability of the storage apparatus, and minimize the amount of heat penetration into the inner container.

That is, in the related art, there is a problem in that only the support member partially interposed between the outer container and the inner container cannot effectively prevent the movement of the inner container relative to the outer container (particularly, upward and downward movements, leftward and rightward movements, and axial movements of the inner container relative to the outer container based on an axis of the inner container).

In addition, in the related art, the plurality of support members needs to be independently disposed between the outer container and the inner container, which causes problems in that a structure and a manufacturing process are complicated, manufacturing efficiency is degraded, and manufacturing costs are increased.

In some examples, the single support wire having the closed-loop shape may connect the inner holder and the outer holder. Therefore, it is possible to obtain an advantageous effect of minimizing the movement of the inner container relative to the outer container and improving the structural rigidity.

In some examples, it is possible to enable the single support wire to prevent all the upward and downward movements (the displacements in a Y-axis direction) of the inner container relative to the outer container, the leftward and rightward movements (the displacements in a Z-axis direction) of the inner container relative to the outer container, and the axial movements (the displacements in an X-axis direction) of the inner container relative to the outer container.

In some examples, the single support wire may stably prevent the displacement of the inner container relative to the outer container without a plurality of support members independently disposed between the outer container and the inner container. Therefore, it is possible to obtain an advantageous effect of simplify the structure and the manufacturing process while ensuring the structural rigidity of the object storage apparatus.

The inner holder may have various structures capable of supporting the support wire in a state in which the support wire is suspended.

In some implementations, the inner holder may include a plurality of inner holder members disposed to be radially spaced apart from one another based on an axis of the inner container, and the support wire may pass through the plurality of inner holder members in common.

The inner holder members, which constitute the inner holder, may be variously changed in number and arrangement structure in accordance with conditions and design specifications.

In some implementations, the inner holder may include: a first inner holder member disposed in a first quadrant region based on an axis of the inner container; a second inner holder member disposed in a second quadrant region based on the axis of the inner container and spaced apart clockwise from the first inner holder member; a third inner holder member disposed in a third quadrant region based on the axis of the inner container and spaced apart clockwise from the second inner holder member; and a fourth inner holder member disposed in a fourth quadrant region based on the axis of the inner container and spaced apart clockwise from the third inner holder member.

In some implementations, the first inner holder member and the third inner holder member may be disposed to be symmetric with respect to the center of the inner container, and the second inner holder member and the fourth inner holder member may be disposed to be symmetric with respect to the center of the inner container.

As described above, in some implementations, the plurality of inner holder members (the first inner holder member, the second inner holder member, the third inner holder member, and the fourth inner holder member) may be disposed to be symmetric with respect to the center of the inner container. Therefore, a supporting force may be uniformly applied to the inner holder members (the first inner holder member, the second inner holder member, the third inner holder member, and the fourth inner holder member) by the support wire. Therefore, it is possible to obtain an advantageous effect of more effectively preventing the upward and downward movements (the displacements in the Y-axis direction) of the inner container relative to the outer container and the leftward and rightward movements (the displacements in the Z-axis direction) of the inner container relative to the outer container.

The inner holder members (the first inner holder member, the second inner holder member, the third inner holder member, and the fourth inner holder member) may each have various structures capable of binding (supporting) the support wire.

In some implementations, the inner holder members (the first inner holder member, the second inner holder member, the third inner holder member, and the fourth inner holder member) may each include an inner holder body, and an inner holder accommodation portion provided in the inner holder body and configured to accommodate the support wire.

In some implementations, the inner holder members (the first inner holder member, the second inner holder member, the third inner holder member, and the fourth inner holder member) may each include an inner curved seating portion provided in the inner holder accommodation portion so that the support wire is seated on the inner curved seating portion.

As described above, the inner curved seating portion may be provided in the inner holder accommodation portion, and the support wire may be seated on (be in surface contact with) the inner curved seating portion. Therefore, it is possible to obtain an advantageous effect of preventing deformation of and damage to the support wire while ensuring a smooth movement of the support wire relative to the inner holder members (minimizing interference and friction between the support wire and the inner holder members).

The outer holder may have various structures capable of supporting the support wire in a state in which the support wire is suspended.

In some implementations, the outer holder may include a plurality of outer holder members disposed to be radially spaced apart from one another based on the axis of the inner container, and the support wire may pass through the plurality of outer holder members in common.

In some implementations, at least any one (a movable outer holder member) of the plurality of outer holder members may be movable relative to the outer container in a direction toward or away from the center of the outer container.

As at least any one of the plurality of outer holder members moves relative to the outer container in the direction toward or away from the center of the outer container as described above, tension of the support wire may be selectively adjusted.

The outer holder members, which constitute the outer holder, may be variously changed in number and arrangement structure in accordance with conditions and design specifications.

In some implementations, the outer holder may include: a movable outer holder member configured to be movable relative to the outer container in the direction toward or away from the center of the outer container; a first stationary outer holder member disposed on the outer container and spaced apart clockwise from the movable outer holder member based on the axis of the inner container; a second stationary outer holder member disposed on the outer container and spaced apart clockwise from the first stationary outer holder member based on the axis of the inner container; and a third stationary outer holder member disposed on the outer container and spaced apart clockwise from the second stationary outer holder member based on the axis of the inner container, and tension of the support wire may be adjustable in accordance with a movement of the movable outer holder member relative to the outer container.

In particular, the movable outer holder member and the second stationary outer holder member may be disposed on an imaginary first reference line passing through the center of the inner container. The first stationary outer holder member and the third stationary outer holder member may be disposed on an imaginary second reference line passing through the center of the inner container.

As described above, in some implementations, the plurality of outer holder members (the movable outer holder member, the first stationary outer holder member, the second stationary outer holder member, and the third stationary outer holder member) may be disposed to be symmetric with respect to the center of the outer container. Therefore, a supporting force may be uniformly applied to the outer holder members (the movable outer holder member, the first stationary outer holder member, the second stationary outer holder member, and the third stationary outer holder member) by the support wire. Therefore, it is possible to obtain an advantageous effect of more effectively preventing the upward and downward movements (the displacements in the Y-axial direction) of the inner container relative to the outer container and the leftward and rightward movements (the displacements in the Z-axial direction) of the inner container relative to the outer container.

The plurality of outer holder members (the movable outer holder member, the first stationary outer holder member, the second stationary outer holder member, and the third stationary outer holder member), which constitute the outer holder, may each have various structures capable of binding (supporting) the support wire.

In some implementations, the outer holder members (the movable outer holder member, the first stationary outer holder member, the second stationary outer holder member, and the third stationary outer holder member) may each include an outer holder body, and an outer holder accommodation portion provided in the outer holder body and configured to accommodate the support wire.

In some implementations, the outer holder members (the movable outer holder member, the first stationary outer holder member, the second stationary outer holder member, and the third stationary outer holder member) may each include an outer curved seating portion provided in the outer holder accommodation portion so that the support wire is seated on the outer curved seating portion.

As described above, the outer curved seating portion may be provided in the outer holder accommodation portion, and the support wire may be seated on (be in surface contact with) the outer curved seating portion. Therefore, it is possible to obtain an advantageous effect of preventing deformation of and damage to the support wire while ensuring a smooth movement of the support wire relative to the outer holder members (minimizing interference and friction between the support wire and the outer holder members).

In some implementations, the cryogenic liquid storage apparatus may include a holder mover disposed on the outer container and configured to selectively move the movable outer holder member in a direction toward or away from the center of the outer container.

The holder mover may have various structures capable of moving the movable outer holder member in the direction toward or away from the center of the outer container.

In some implementations, the holder mover may include: a fixing block fixed to the outer container and having a through-hole; and an adjustment bolt configured to penetrate the through-hole and fastened to a bolt hole provided in the movable outer holder member, and the movable outer holder member may be moved in the direction toward or away from the center of the outer container in accordance with a rotation of the adjustment bolt.

As described above, in some implementations, the movable outer holder member may be selectively moved by the holder mover in the direction toward or away from the center of the outer container, such that the tension of the support wire may be selectively adjusted. Therefore, it is possible to stably ensure a supporting force generated by the support wire (increase the tension of the support wire) without being restricted by manufacturing tolerance and assembly tolerance of the outer container and the inner container.

That is, because the support wire is provided as a unitary one-piece structure (single body) having a closed-loop shape, the tension of the entire support wire, including a particular portion of the support wire (e.g., a portion connected to the movable outer holder member), may be adjusted only by partially pulling the particular portion of the support wire or loosening the particular portion of the support wire. Therefore, the supporting forces, which are applied to the inner holder and the outer holder by the support wire, may be uniformly and simultaneously adjusted based on the movement of the movable outer holder member.

In some implementations, the inner holder may be disposed at an end of the inner container, and the outer holder may be disposed at an end of the outer container corresponding to the inner holder.

The support wire may be made of various materials in accordance with conditions and design specifications.

In some implementations, the support wire may be made of at least any one of Zylon® and Kevlar®.

Because the support wire is made of Zylon® or Kevlar® as described above, it is possible to stably ensure the supporting force generated by the support wire and minimize heat to be transferred (by conduction) from the outer container to the inner container via the support wire. Therefore, it is possible to obtain an advantageous effect of stably ensuring the performance in thermally insulating the inner container.

In some implementations, the inner holder may include an inner holder drum disposed on the inner container, and the support wire may be continuously wound around the inner holder drum in a circumferential direction of the inner holder drum.

The inner holder drum may have various structures around which the support wire may be wound.

In some implementations, the inner holder drum may include: a drum main body disposed on the inner container; and a drum accommodation portion provided in the drum main body and configured to accommodate the support wire so that the support wire is wound.

In some implementations, the inner holder drum of the cryogenic liquid storage apparatus may include a drum curved seating portion provided in the drum accommodation portion so that the support wire is seated on the drum curved seating portion.

As described above, the drum curved seating portion may be provided in the drum accommodation portion, and the support wire may be seated on (be in surface contact with) the drum curved seating portion. Therefore, it is possible to obtain an advantageous effect of preventing deformation of and damage to the support wire while ensuring a smooth movement of the support wire relative to the inner holder drum (minimizing interference and friction between the support wire and the inner holder drum).

DETAILED DESCRIPTION

Figure 1:
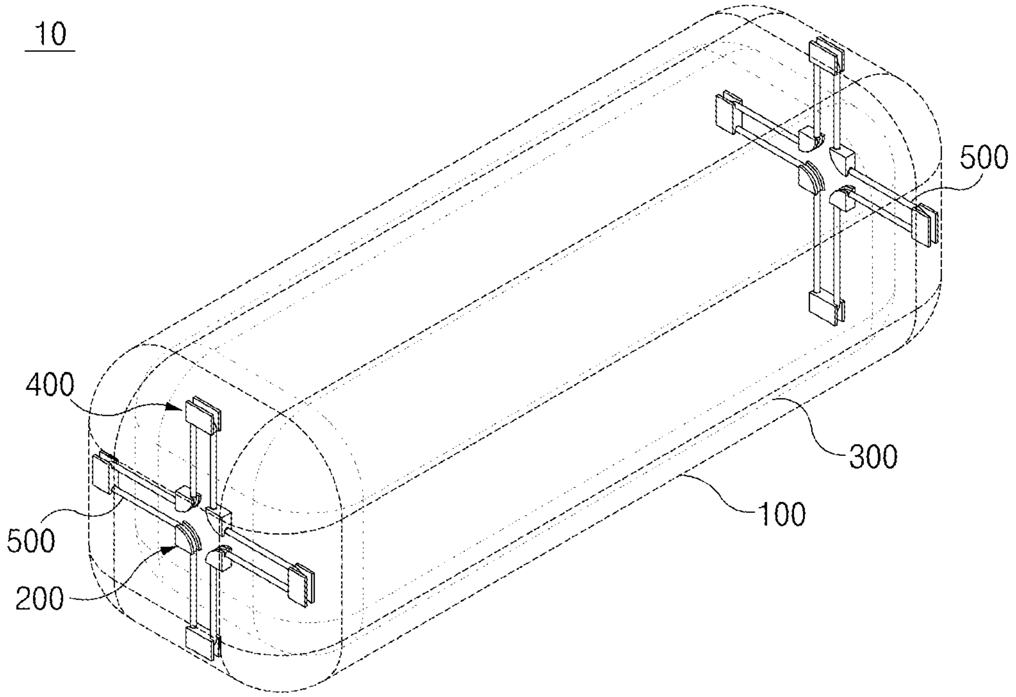
FIG. 1 is a view showing an example of a cryogenic liquid storage apparatus.

Hereinafter, exemplary implementations of the present disclosure will be described in detail with reference to the accompanying drawings. However, the technical spirit of the present disclosure is not limited to some implementations described herein but may be implemented in various different forms. One or more of the constituent elements in the implementations may be selectively combined and substituted for use within the scope of the technical spirit of the present disclosure.

Referring to FIGS. 1 to 14, in some implementations, a cryogenic liquid storage apparatus 10 includes: an inner container 100 configured to store an object; inner holders 200 disposed on the inner container 100; an outer container 300 configured to surround the inner container 100; outer holders 400 disposed on the outer container 300; and support wires 500 each provided as a unitary one-piece structure (single body) having a closed-loop shape and configured to support the inner container 100 with respect to the outer container 300 while passing through the outer holder 400 and the inner holder 200.

The cryogenic liquid storage apparatus 10 may be used to store various objects in accordance with conditions and design specifications. The present disclosure is not restricted or limited by the type and properties of the object.

For example, the cryogenic liquid storage apparatus 10 may be used to store fuel (e.g., hydrogen) used for mobility vehicles such as fuel cell electric vehicles (e.g., passenger vehicles or commercial vehicles), ships, and aircraft.

Figure 2:
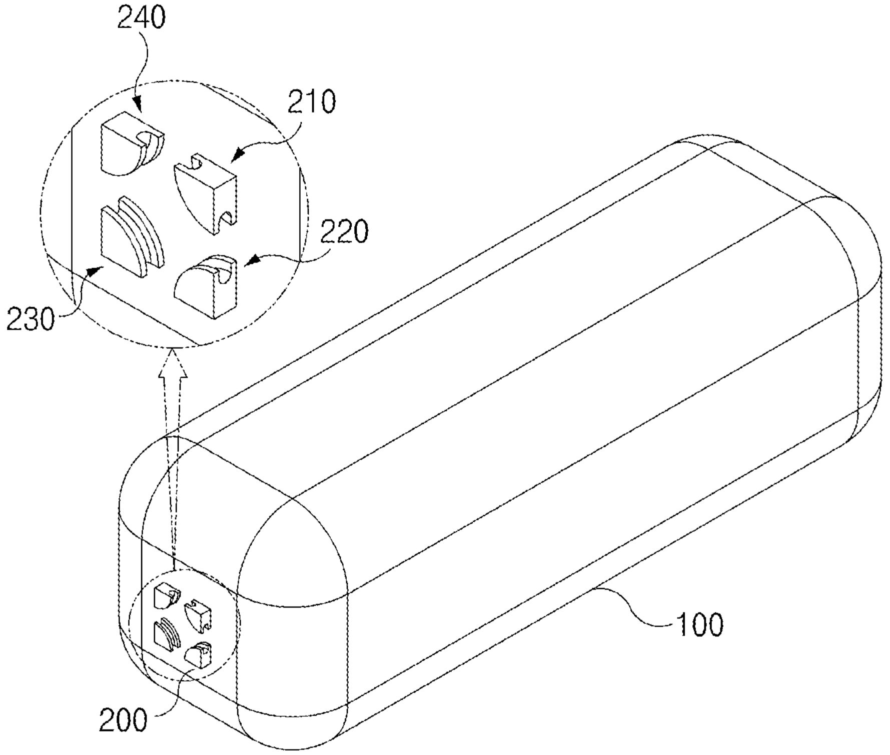
FIG. 2 is a view showing an example of an inner container of the cryogenic liquid storage apparatus.

Referring to FIGS. 1 and 2, the inner container 100 is used to store liquid hydrogen (cryogenic liquid hydrogen) used for a fuel cell stack.

The inner container 100 may have various structures configured to store liquid hydrogen (e.g., at −253° C.). The present disclosure is not restricted or limited by the type and structure of the inner container 100.

For example, the inner container 100 may be provided in the form of a hollow cylinder having an accommodation space having a circular cross-section. In some implementations, the inner container may have a quadrangular cross-sectional shape or other cross-sectional shapes.

In addition, a charge line for charging the inner container 100 with hydrogen may be connected to the inner container 100. A charge valve may be disposed in the charge line and adjust (e.g., turn on or off) a flow of hydrogen supplied through the charge line. Various types of sensors (e.g., a temperature sensor and a pressure sensor) may be disposed in the charge line.

Figure 3:
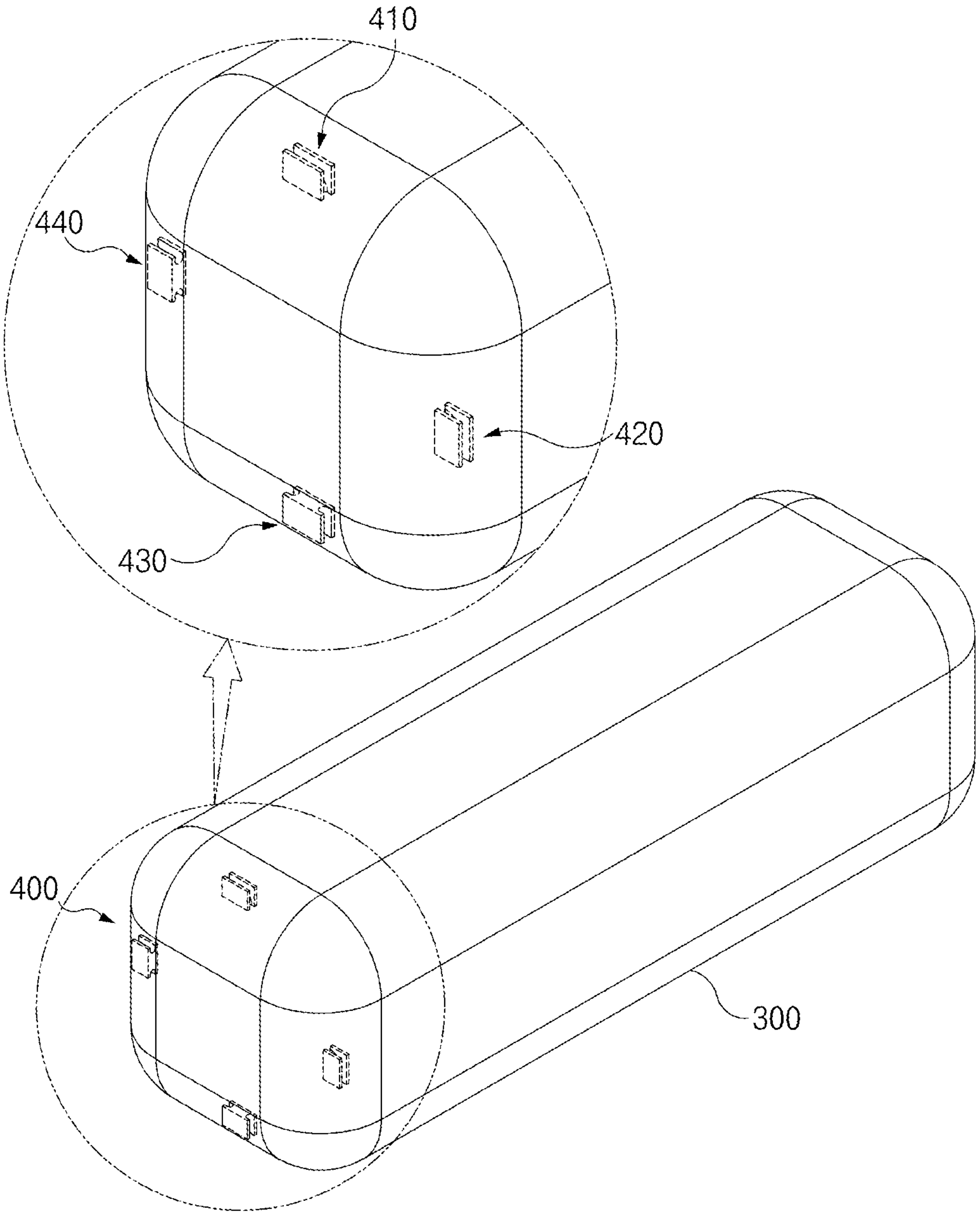
FIG. 3 is a view showing an example of an outer container of the cryogenic liquid storage apparatus.

Referring to FIGS. 1 and 3, the outer container 300 is configured to surround the inner container 100 and protect the inner container 100.

In this case, the configuration in which the outer container 300 surrounds the inner container 100 includes both a case in which the outer container 300 surrounds a part of the inner container 100 and a case in which the outer container 300 surrounds the entire inner container 100. Hereinafter, an example will be described in which the outer container 300 surrounds the entire inner container 100.

The outer container 300 may have various structures capable of surrounding the inner container 100. The present disclosure is not restricted or limited by the structure and shape of the outer container 300.

For example, the outer container 300 may include a cylinder container part having a hollow cylindrical shape, and side container parts configured to cover two opposite ends of the cylinder container part and each having an approximately domical shape. The cylinder container part and the side container part may be integrally connected by welding or the like.

In particular, a space between the outer container 300 and the inner container 100 may be in a vacuum state.

For reference, in some implementations described above, the example has been described in which the outer container 300 includes the three container parts (the single cylinder container part and the two side container parts). However, in some implementations, the outer container may include four or more container parts or two or fewer container parts.

Meanwhile, the inner holder 200 is disposed on the inner container 100, and the outer holder 400 is disposed on the outer container 300. The support wire 500 is configured to support the inner container 100 with respect to the outer container 300 while continuously passing through the outer holder 400 and the inner holder 200 so that the inner container 100 is spaced apart from the outer container 300.

The inner holder 200 is disposed on the inner container 100 and configured to connect the support wire 500 to the inner container 100.

The inner holder 200 may have various structures capable of supporting the support wire 500 in a state in which the support wire 500 is suspended. The present disclosure is not restricted or limited by the structure of the inner holder 200.

In particular, the inner holders 200 may be respectively provided at two opposite ends of the inner container 100 based on a longitudinal direction (axial direction) of the inner container 100. In some implementations, the inner holder may be provided only at one end of the inner container based on the longitudinal direction (axial direction) of the inner container. Alternatively, the inner holder may be provided on a lateral portion or other portions of the inner container instead of the end of the inner container.

In some implementations, the inner holder 200 may include a plurality of inner holder members disposed to be radially spaced apart from one another based on the axis of the inner container 100. The support wire 500 may be provided to pass through the plurality of inner holder members in common.

The inner holder members, which constitute the inner holder 200, may be variously changed in number and arrangement structure in accordance with conditions and design specifications. The present disclosure is not restricted or limited by the number of inner holder members and the arrangement structure of the inner holder members.

Hereinafter, an example will be described in which the inner holder 200 includes four inner holder members. In some implementations, the inner holder may include five or more inner holder members or three or fewer inner holder members.

In some implementations, the inner holder 200 may include: a first inner holder member 210 disposed in a first quadrant region based on the axis of the inner container 100; a second inner holder member 220 spaced apart clockwise from the first inner holder member 210 and disposed in a second quadrant region based on the axis of the inner container 100; a third inner holder member 230 spaced apart clockwise from the second inner holder member 220 and disposed in a third quadrant region based on the axis of the inner container 100; and a fourth inner holder member 240 spaced apart clockwise from the third inner holder member 230 and disposed in a fourth quadrant region based on the axis of the inner container 100.

In particular, the first inner holder member 210 and the third inner holder member 230 may be disposed to be symmetric with respect to the center of the inner container 100. The second inner holder member 220 and the fourth inner holder member 240 may be disposed to be symmetric with respect to the center of the inner container 100.

Figure 8:
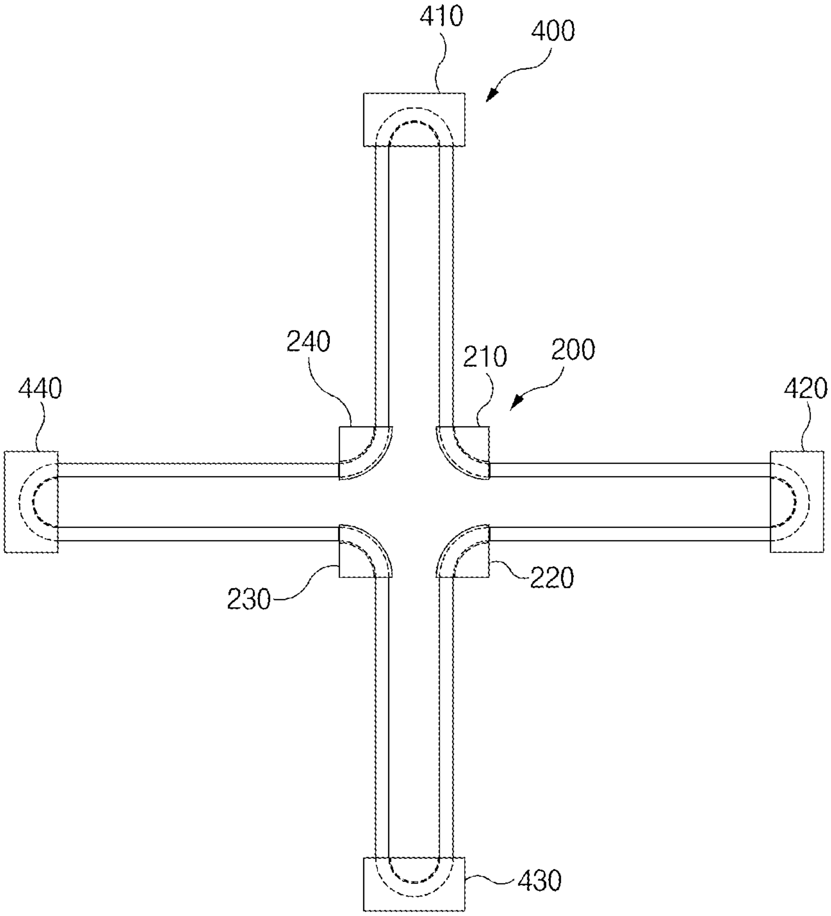
FIGS. 8 and 9 are views showing an example structure for connecting the inner and outer holders and the support wire of the cryogenic liquid storage apparatus.
Figure 9:
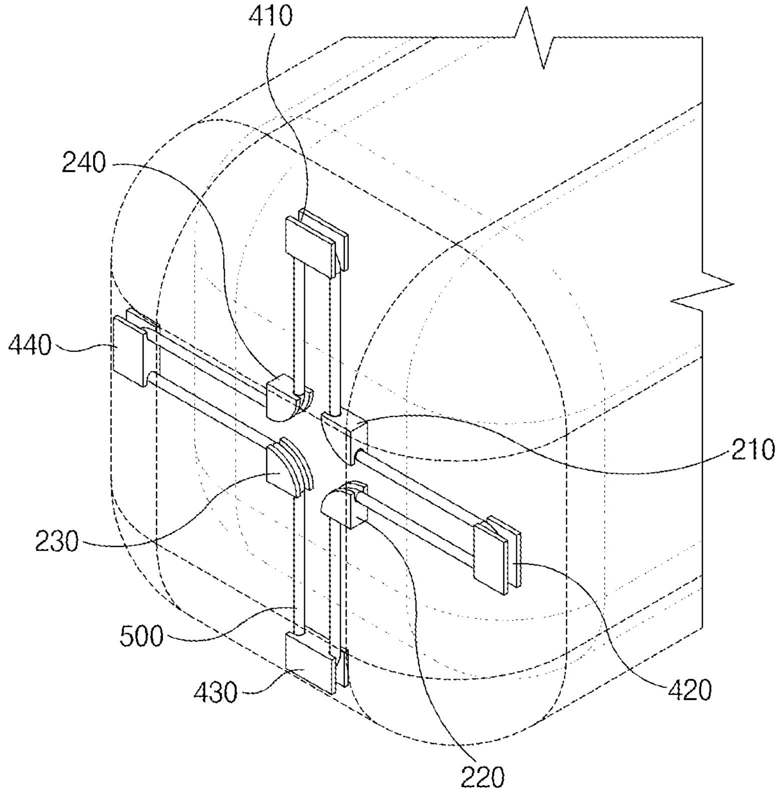

For example, referring to FIG. 2 or FIGS. 8 and 9, the first inner holder member 210 may be disposed at an approximately one-thirty position (based on the clockwise direction) based on the center of the inner container 100, the second inner holder member 220 may be disposed at an approximately four-thirty position (based on the clockwise direction) based on the center of the inner container 100, the third inner holder member 230 may be disposed at an approximately seven-thirty position (based on the clockwise direction) based on the center of the inner container 100, and the fourth inner holder member 240 may be disposed at an approximately ten-thirty position (based on the clockwise direction) based on the center of the inner container 100.

More particularly, the first inner holder member 210, the second inner holder member 220, the third inner holder member 230, and the fourth inner holder member 240 may be disposed on the same circumference based on the center of the inner container 100.

Hereinafter, an example will be described in which the first inner holder member 210, the second inner holder member 220, the third inner holder member 230, and the fourth inner holder member 240 are disposed in the form of a 2*2 square matrix.

As described above, in some implementations, the plurality of inner holder members (the first inner holder member 210, the second inner holder member 220, the third inner holder member 230, and the fourth inner holder member 240) may be disposed at equal intervals on the same circumference based on the center of the inner container 100. Therefore, a supporting force may be uniformly applied to the inner holder members (the first inner holder member 210, the second inner holder member 220, the third inner holder member 230, and the fourth inner holder member 240) by the support wire 500. Therefore, it is possible to obtain an advantageous effect of more effectively preventing the upward and downward movements (the displacements in the Y-axis direction) of the inner container 100 relative to the outer container 300 and the leftward and rightward movements (the displacements in the Z-axis direction) of the inner container 100 relative to the outer container 300.

The plurality of inner holder members (the first inner holder member 210, the second inner holder member 220, the third inner holder member 230, and the fourth inner holder member 240), which constitutes the inner holder 200, may each have various structures capable of binding (supporting) the support wire 500. The present disclosure is not restricted or limited by the structure and shape of the inner holder member.

Figure 4:
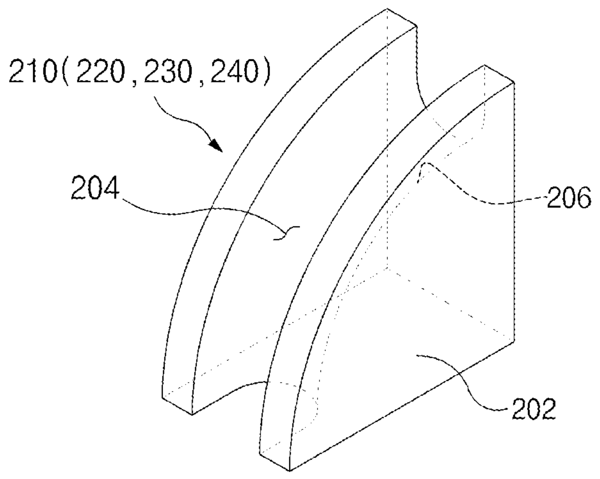
FIG. 4 is a view showing an example of an inner holder member of the cryogenic liquid storage apparatus.

Referring to FIG. 4, in some implementations, the inner holder members (the first inner holder member 210, the second inner holder member 220, the third inner holder member 230, and the fourth inner holder member 240) may each include an inner holder body 202, and an inner holder accommodation portion 204 provided in the inner holder body 202 and configured to accommodate the support wire 500.

For example, the inner holder body 202 may have an approximately fan shape (e.g., a ¼ circular shape) and include a first plate member, a second plate member disposed to be spaced apart from the first plate member, and a connection portion configured to connect the first plate member and the second plate member. The inner holder accommodation portion 204 may be defined between the first plate member and the second plate member.

The inner holder accommodation portion 204 may have various structures capable of accommodating the support wire 500. In particular, the inner holder accommodation portion 204 may have an approximately circular arc shape. A depth of the inner holder accommodation portion 204 (a depth in which the support wire 500 is accommodated) may be larger than a diameter (thickness) of the support wire 500.

In some implementations, the depth of the inner holder accommodation portion may be smaller than the diameter (thickness) of the support wire.

In some implementations, the support wire 500 may be accommodated in the inner holder accommodation portion 204 and prevent the axial movements (the displacements in the X-axis direction) of the inner container 100 relative to the outer container 300.

In some implementations, the inner holder members (the first inner holder member 210, the second inner holder member 220, the third inner holder member 230, and the fourth inner holder member 240) may each include an inner curved seating portion 206 provided in the inner holder accommodation portion 204 so that the support wire 500 is seated on the inner curved seating portion 206.

For example, the support wire 500 may have a circular cross-section. The inner curved seating portion 206 may have an approximately semicircular cross-sectional shape corresponding to a curvature of the support wire 500.

As described above, the inner curved seating portion 206 may be provided in the inner holder accommodation portion 204, and the support wire 500 may be seated on (be in surface contact with) the inner curved seating portion 206. Therefore, it is possible to obtain an advantageous effect of preventing deformation of and damage to the support wire 500 while ensuring a smooth movement of the support wire 500 relative to the inner holder members 210, 220, 230, and 240 (minimizing interference and friction between the support wire and the inner holder members).

The inner holder members (the first inner holder member 210, the second inner holder member 220, the third inner holder member 230, and the fourth inner holder member 240), which constitute the inner holder 200, may be connected (fixed) to the inner container 100 in various ways in accordance with conditions and design specifications.

For example, the inner holder members (the first inner holder member 210, the second inner holder member 220, the third inner holder member 230, and the fourth inner holder member 240) may be integrally fixed to an outer surface of the inner container 100 by welding. In some implementations, the inner holder member may be fastened to the inner container by means of a fastening member, or the inner holder member may be fixed to the inner container by other methods.

Referring to FIG. 3 or FIGS. 8 and 9, the outer holder 400 is disposed on the outer container 300 and configured to connect the support wire 500 to the outer container 300.

The outer holder 400 may have various structures capable of supporting the support wire 500 in a state in which the support wire 500 is suspended. The present disclosure is not restricted or limited by the structure of the outer holder 400.

In particular, the outer holders 400 may be respectively provided at two opposite ends of the outer container 300 based on a longitudinal direction (axial direction) of the outer container 300. In some implementations, the outer holder may be provided only at one end of the outer container based on the longitudinal direction (axial direction) of the outer container. Alternatively, the outer holder may be provided on a lateral portion or other portions of the outer container instead of the end of the outer container.

In some implementations, the outer holder 400 may include a plurality of outer holder members disposed to be radially spaced apart from one another based on the axis of the inner container 100. The support wire 500 may be provided to pass through the plurality of outer holder members in common.

The outer holder members, which constitute the outer holder 400, may be variously changed in number and arrangement structure in accordance with conditions and design specifications. The present disclosure is not restricted or limited by the number of outer holder members and the arrangement structure of the outer holder members.

Hereinafter, an example will be described in which the outer holder 400 includes four outer holder members. In some implementations, the outer holder may include five or more outer holder members or three or fewer outer holder members.

In some implementations, at least any one (a movable outer holder member 410) of the plurality of outer holder members may be movable relative to the outer container 300 in a direction toward or away from the center of the outer container 300.

As at least any one of the plurality of outer holder members moves relative to the outer container 300 in the direction toward or away from the center of the outer container 300 as described above, tension of the support wire 500 may be selectively adjusted.

In some implementations, the outer holder 400 may include: the movable outer holder member 410 configured to be movable relative to the outer container 300 in the direction toward or away from the center of the outer container 300; a first stationary outer holder member 420 disposed on the outer container 300 and spaced apart clockwise from the movable outer holder member 410 based on the axis of the inner container 100; a second stationary outer holder member 430 disposed on the outer container 300 and spaced apart clockwise from the first stationary outer holder member 420 based on the axis of the inner container 100; and a third stationary outer holder member 440 disposed on the outer container 300 and spaced apart clockwise from the second stationary outer holder member 430 based on the axis of the inner container 100. The tension of the support wire 500 may be adjusted in accordance with the movement of the movable outer holder member 410 relative to the outer container 300.

In particular, the movable outer holder member 410 and the second stationary outer holder member 430 may be disposed on an imaginary first reference line passing through the center of the inner container 100. The first stationary outer holder member 420 and the third stationary outer holder member 440 may be disposed on an imaginary second reference line passing through the center of the inner container 100.

For example, the movable outer holder member 410 may be disposed at the 12 o'clock position based on the center of the inner container 100, the first stationary outer holder member 420 may be disposed at the 3 o'clock position based on the center of the inner container 100, the second stationary outer holder member 430 may be disposed at the 6 o'clock position based on the center of the inner container 100, and the third stationary outer holder member 440 may be disposed at the 9 o'clock position based on the center of the inner container 100.

More particularly, the movable outer holder member 410, the first stationary outer holder member 420, the second stationary outer holder member 430, and the third stationary outer holder member 440 may be disposed on the same circumference based on the center of the outer container 300.

As described above, in some implementations, the plurality of outer holder members (the movable outer holder member 410, the first stationary outer holder member 420, the second stationary outer holder member 430, and the third stationary outer holder member 440) may be disposed at equal intervals on the same circumference based on the center of the outer container 300. Therefore, a supporting force may be uniformly applied to the outer holder members (the movable outer holder member 410, the first stationary outer holder member 420, the second stationary outer holder member 430, and the third stationary outer holder member 440) by the support wire 500. Therefore, it is possible to obtain an advantageous effect of more effectively preventing the upward and downward movements (the displacements in the Y-axial direction) of the inner container 100 relative to the outer container 300 and the leftward and rightward movements (the displacements in the Z-axial direction) of the inner container 100 relative to the outer container 300.

The stationary outer holder members (e.g., the first stationary outer holder member 420, the second stationary outer holder member 430, and the third stationary outer holder member 440), which constitute the outer holder 400, may be connected to the outer container 300 in various ways in accordance with conditions and design specifications.

For example, the stationary outer holder members (e.g., the first stationary outer holder member 420, the second stationary outer holder member 430, and the third stationary outer holder member 440) may be integrally fixed to an inner surface of the outer container 300 by welding. In some implementations, the outer holder member may be fastened to the outer container by means of a fastening member, or the stationary outer holder member may be fixed to the outer container by other methods.

The plurality of outer holder members (the movable outer holder member 410, the first stationary outer holder member 420, the second stationary outer holder member 430, and the third stationary outer holder member 440), which constitute the outer holder 400, may each have various structures capable of binding (supporting) the support wire 500. The present disclosure is not restricted or limited by the structure and shape of the outer holder member.

Figure 5:
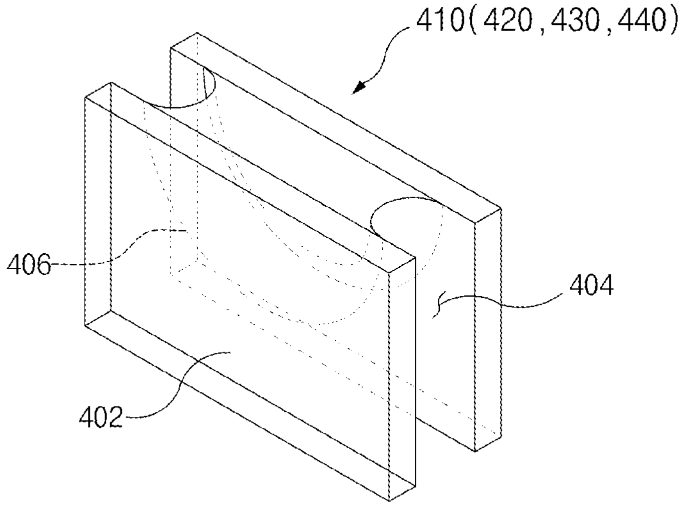
FIG. 5 is a view showing an example of an outer holder member of the cryogenic liquid storage apparatus.

Referring to FIG. 5, in some implementations, the outer holder members (the movable outer holder member 410, the first stationary outer holder member 420, the second stationary outer holder member 430, and the third stationary outer holder member 440) may each include an outer holder body 402, and an outer holder accommodation portion 404 provided in the outer holder body 402 and configured to accommodate the support wire 500.

For example, the outer holder body 402 may be provided in the form of an approximately quadrangular block and include a first plate member, a second plate member disposed to be spaced apart from the first plate member, and a connection portion configured to connect the first plate member and the second plate member. The outer holder accommodation portion 404 may be defined between the first plate member and the second plate member.

The outer holder accommodation portion 404 may have various structures capable of accommodating the support wire 500. In particular, the outer holder accommodation portion 404 may have an approximately semicircular shape. A depth of the outer holder accommodation portion 404 (a depth in which the support wire 500 is accommodated) may be larger than the diameter (thickness) of the support wire 500.

In some implementations, the depth of the outer holder accommodation portion may be smaller than the diameter (thickness) of the support wire.

In some implementations, the support wire 500 may be accommodated in the outer holder accommodation portion 404 and prevent the movement of the support wire 500 relative to the outer container 300 in the axial direction of the inner container 100.

In some implementations, the outer holder members (the movable outer holder member 410, the first stationary outer holder member 420, the second stationary outer holder member 430, and the third stationary outer holder member 440) may each include an outer curved seating portion 406 provided in the outer holder accommodation portion 404 so that the support wire 500 is seated on the outer curved seating portion 406.

For example, the support wire 500 may have a circular cross-section. The outer curved seating portion 406 may have an approximately semicircular cross-sectional shape corresponding to the curvature of the support wire 500.

As described above, the outer curved seating portion 406 may be provided in the outer holder accommodation portion 404, and the support wire 500 may be seated on (be in surface contact with) the outer curved seating portion 406. Therefore, it is possible to obtain an advantageous effect of preventing deformation of and damage to the support wire 500 while ensuring a smooth movement of the support wire 500 relative to the outer holder members 410, 420, 430, and 440 (minimizing interference and friction between the support wire and the outer holder members).

Figure 10:
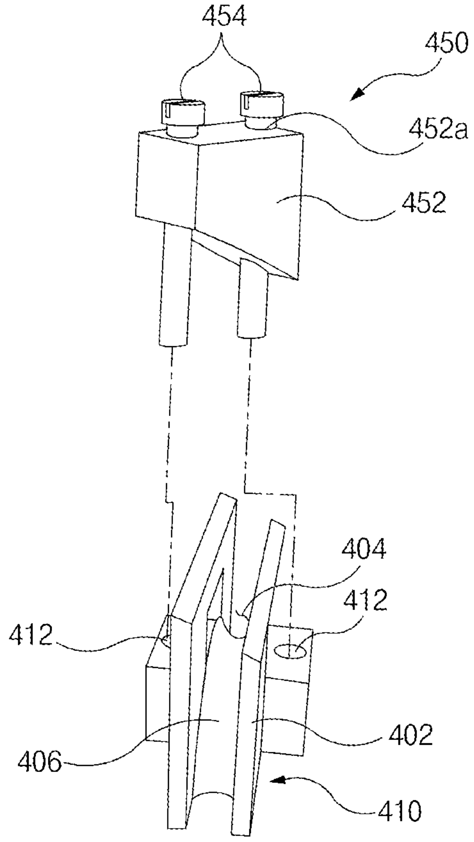
FIGS. 10 and 11 are views showing an example of a holder mover of the cryogenic liquid storage apparatus.
Figure 11:
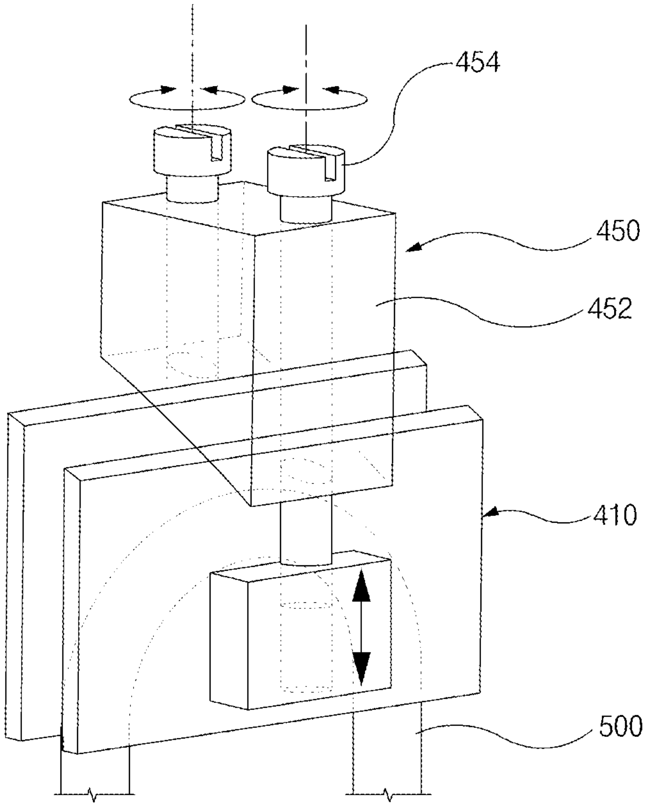

Referring to FIGS. 10 and 11, in some implementations, the cryogenic liquid storage apparatus 10 may include a holder mover 450 disposed on the outer container 300 and configured to selectively move the movable outer holder member 410 in a direction toward or away from the center of the outer container 300.

The holder mover 450 may have various structures capable of moving the movable outer holder member 410 in the direction toward or away from the center of the outer container 300. The present disclosure is not restricted or limited by the structure of the holder mover 450 and the method of operating the holder mover 450.

For example, the holder mover 450 may include: a fixing block 452 fixed to the outer container 300 and having through-holes 452a; and adjustment bolts 454 configured to penetrate the through-holes 452a and fastened to bolt holes 412 provided in the movable outer holder member 410. The movable outer holder member 410 may move in the direction toward or away from the center of the outer container 300 in accordance with rotations of the adjustment bolts 454.

For example, the fixing block 452 may be attached (welded or fastened) to an outer surface of the outer container 300. The adjustment bolt 454 may penetrate the through-hole 452a and the outer container 300 and be then fastened (screw-fastened) to the bolt hole 412 of the movable outer holder member 410. When the adjustment bolt 454 rotates clockwise or counterclockwise, a gap between the fixing block 452 and the movable outer holder member 410 may be changed, such that the movable outer holder member 410 may move in the direction toward or away from the center of the outer container 300.

In some implementations illustrated and described above, the example has been described in which the movable outer holder member 410 is moved as the adjustment bolt 454 is manually operated. However, in some implementations, the adjustment bolt may be configured to be rotated by a separate driving source (e.g., a motor).

As described above, in some implementations, the movable outer holder member 410 may be selectively moved by the holder mover 450 in the direction toward or away from the center of the outer container 300, such that the tension of the support wire 500 may be selectively adjusted. Therefore, it is possible to stably ensure a supporting force generated by the support wire 500 (increase the tension of the support wire 500) without being restricted by manufacturing tolerance and assembly tolerance of the outer container 300 and the inner container 100.

That is, because the support wire 500 is provided as a unitary one-piece structure (single body) having a closed-loop shape, the tension of the entire support wire 500, including a particular portion of the support wire 500 (e.g., a portion connected to the movable outer holder member 410), may be adjusted only by partially pulling the particular portion of the support wire 500 or loosening the particular portion of the support wire 500. Therefore, the supporting forces, which are applied to the inner holder 200 and the outer holder 400 by the support wire 500, may be uniformly and simultaneously adjusted based on the movement of the movable outer holder member 410.

The support wire 500 may be supported by the inner holder 200 and the outer holder 400 so that the inner container 100 is spaced apart from the outer container 300.

The support wire 500 may have various structures capable of passing, in common, through the inner holder members (the first inner holder member 210, the second inner holder member 220, the third inner holder member 230, and the fourth inner holder member 240) and the outer holder members (the movable outer holder member 410, the first stationary outer holder member 420, the second stationary outer holder member 430, and the third stationary outer holder member 440). The present disclosure is not restricted or limited by the structure and shape of the support wire 500.

Figure 6:
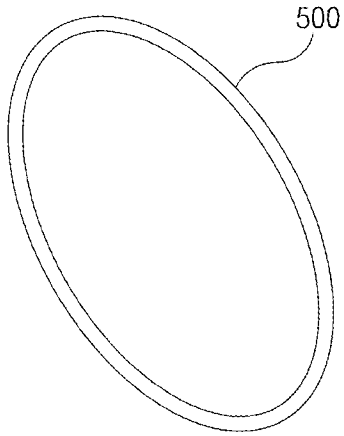
FIGS. 6 and 7 are views showing an example of a support wire of the cryogenic liquid storage apparatus.

For example, referring to FIG. 6, the support wire 500 may be provided in the form of an approximately circular ring.

Figure 7:
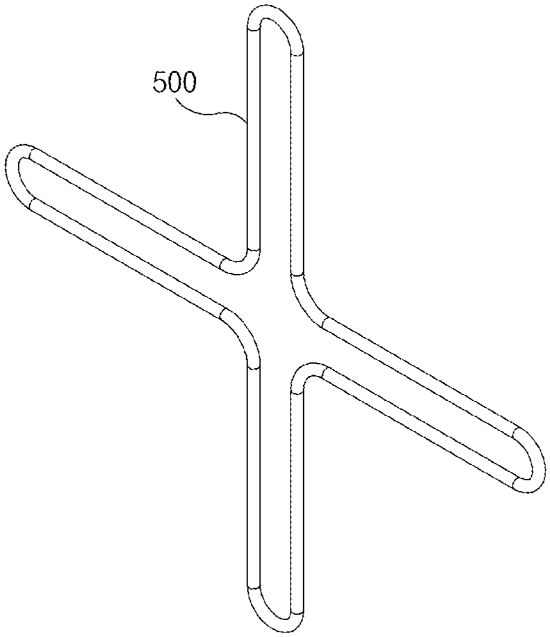

In contrast, as illustrated in FIG. 7, when the support wire 500 is supported by the inner holder members (the first inner holder member 210, the second inner holder member 220, the third inner holder member 230, and the fourth inner holder member 240) and the outer holder members (the movable outer holder member 410, the first stationary outer holder member 420, the second stationary outer holder member 430, and the third stationary outer holder member 440), the support wire 500 may be disposed to have an approximately cross shape.

That is, the support wire 500 may be disposed to have an approximately cross shape as inner diameter portions of the support wire 500 are wound around the outer holder members (the movable outer holder member 410, the first stationary outer holder member 420, the second stationary outer holder member 430, and the third stationary outer holder member 440), and outer diameter portions of the support wire 500 are supported on the inner holder members (the first inner holder member 210, the second inner holder member 220, the third inner holder member 230, and the fourth inner holder member 240).

The support wire 500 may be made of various materials in accordance with conditions and design specifications. The present disclosure is not restricted or limited by the material and properties of the support wire 500.

In particular, the support wire 500 may be made of a material having high mechanical strength and very low thermal conductivity.

In some implementations, the support wire 500 may be made of at least one of Zylon® and Kevlar® having high mechanical strength and low thermal conductivity.

Because the support wire 500 is made of Zylon® or Kevlar® as described above, it is possible to stably ensure the supporting force generated by the support wire 500 and minimize heat to be transferred (by conduction) from the outer container 300 to the inner container 100 via the support wire 500. Therefore, it is possible to obtain an advantageous effect of stably ensuring the performance in thermally insulating the inner container 100.

In some implementations, the support wire may be made of a synthetic resin material or other metallic materials.

In some examples, the example has been described in which the inner holder 200 includes the plurality of inner holder members disposed to be radially spaced apart from one another based on the axis of the inner container 100. However, in some implementations, the inner holder 200 may include a single inner holder drum 250.

Figure 12:
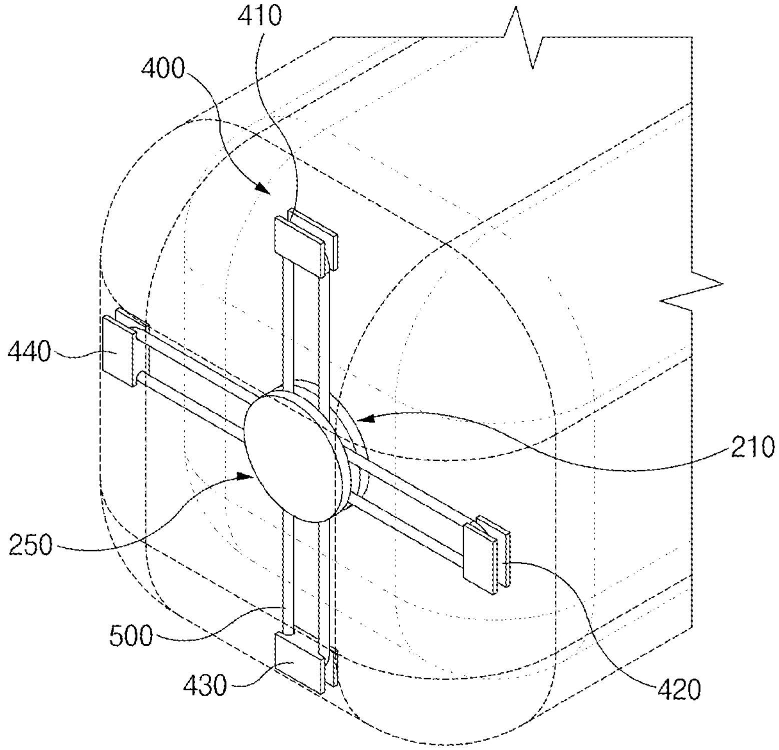
FIGS. 12 to 14 are views showing an example of an inner holder of the cryogenic liquid storage apparatus.
Figure 13:
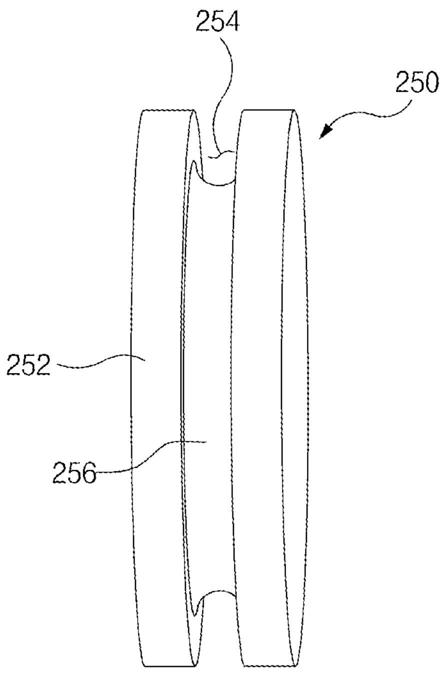
Figure 14:
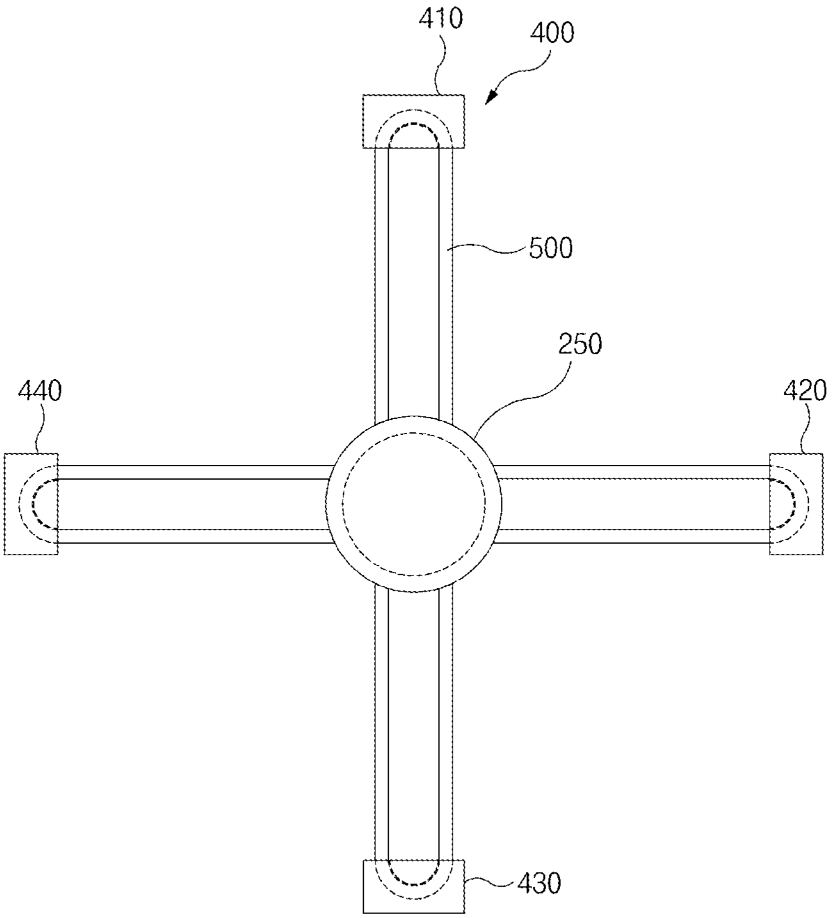

That is, referring to FIGS. 12 to 14, the cryogenic liquid storage apparatus 10 may include the inner container 100, the inner holder 200, the outer container 300, the outer holder 400, and the support wire 500, and the inner holder 200 may include the inner holder drum 250 disposed on the inner container 100. The support wire 500 may be continuously wound around the inner holder drum 250 in a circumferential direction of the inner holder drum 250.

In this case, the configuration in which the support wire 500 is continuously wound in the circumferential direction of the inner holder drum 250 is understood as a configuration in which the support wire 500 may be wound around the inner holder drum 250 by 360 degrees in the circumferential direction of the inner holder drum 250.

The inner holder drum 250 may have various structures around which the support wire 500 may be wound. The present disclosure is not restricted or limited by the structure of the inner holder drum 250.

For example, the inner holder drum 250 may include a drum main body 252 disposed on the inner container 100, and a drum accommodation portion 254 disposed in the drum main body 252 and configured to accommodate the support wire 500 so that the support wire 500 may be wound around the inner holder drum 250.

For example, the inner holder drum 250 may be provided in the form of an approximately circular block and include a first circular plate member, a second circular plate member disposed to be spaced apart from the first circular plate member, and a connection portion configured to connect the first circular plate member and the second circular plate member. The drum accommodation portion 254 may be defined between the first plate member and the second plate member.

The drum accommodation portion 254 may have various structures capable of accommodating the support wire 500 so that the support wire 500 may be wound around the drum accommodation portion 254. In particular, the drum accommodation portion 254 may have an approximately circular ring shape. A depth of the drum accommodation portion 254

(a depth in which the support wire 500 is accommodated) may be larger than a diameter (thickness) of the support wire 500.

In some implementations, the depth of the drum accommodation portion may be smaller than the diameter (thickness) of the support wire.

In some implementations, the support wire 500 may be accommodated in the drum accommodation portion 254 and prevent the axial movements (the displacements in the X-axial direction) of the inner container 100 relative to the outer container 300.

In some implementations, the inner holder drum 250 of the cryogenic liquid storage apparatus 10 may include a drum curved seating portion 256 provided in the drum accommodation portion 254 so that the support wire 500 is seated on the drum curved seating portion 256.

For example, the support wire 500 may have a circular cross-section. The drum curved seating portion 256 may have an approximately semicircular cross-sectional shape corresponding to the curvature of the support wire 500.

As described above, the drum curved seating portion 256 may be provided in the drum accommodation portion 254, and the support wire 500 may be seated on (be in surface contact with) the drum curved seating portion 256. Therefore, it is possible to obtain an advantageous effect of preventing deformation of and damage to the support wire 500 while ensuring a smooth movement of the support wire 500 relative to the inner holder drum 250 (minimizing interference and friction between the support wire and the inner holder drum).

In some implementations, it is possible to obtain an advantageous effect of ensuring structural rigidity, improving safety and reliability, and minimizing the amount of heat penetration into the inner container.

For instance, it is possible to obtain an advantageous effect of minimizing the movement of the inner container relative to the outer container and improving the structural rigidity.

In some examples, it is possible to obtain an advantageous effect of enabling the single support wire to prevent all or any one of the upward and downward movements (the displacements in a Y-axis direction) of the inner container relative to the outer container, the leftward and rightward movements (the displacements in a Z-axis direction) of the inner container relative to the outer container, and the axial movements (the displacements in an X-axis direction) of the inner container relative to the outer container.

In some examples, it is possible to obtain an advantageous effect of simplifying the structure and the manufacturing process and reducing the manufacturing costs.

In some examples, it is possible to obtain an advantageous effect of minimizing heat transferred (by conduction) from the outer container to the inner container and ensuring performance in thermally insulating the inner container.

For example, it is possible to obtain an advantageous effect of remarkably reducing the amount of heat penetration into the inner container in comparison with a case in which a support member, which is provided in the form of a hollow tube and made of a plastic material, is disposed between the outer container and the inner container (e.g., reducing the amount of heat penetration into the inner container by approximately 52% in comparison with the case in which the support member provided in the form of a hollow tube and made of a plastic material is used).

In some examples, it is possible to obtain an advantageous effect of preventing an excessive increase in temperature of the object, preventing excessive vaporization of the object, and preventing an excessive increase in pressure of the inner container (excessive expansion of the inner container).

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective constituent elements specifically described in the implementations may be modified and then carried out. Further, it should be interpreted that the differences related to the modifications and applications are included in the scope of the present disclosure defined by the appended claims.

What is claimed is:

1. A cryogenic liquid storage apparatus comprising:

an inner container configured to store a cryogenic liquid;

an inner holder disposed at the inner container;

an outer container that surrounds the inner container;

an outer holder disposed at the outer container; and a support wire that is a single body defining a continuous closed-loop shape that continuously passes through the outer holder and the inner holder, the support wire being configured to support the inner container with respect to the outer container, wherein the inner holder comprises a plurality of inner holder members that are circumferentially spaced apart from one another and arranged about an axis of the inner container, wherein the support wire passes through the plurality of inner holder members, wherein each of the plurality of inner holder members comprises an inner holder body that defines an inner holder accommodation portion accommodating the support wire, and wherein the inner holder accommodation portion comprises an inner curved seating portion that is in contact with the support wire and recessed from an inner surface of the inner holder body in a cross-sectional shape corresponding to the support wire.

2. The cryogenic liquid storage apparatus of claim 1, wherein the outer holder comprises a plurality of outer holder members that are circumferentially spaced apart from one another and arranged about the axis of the inner container, and wherein the support wire passes through the plurality of outer holder members.

3. The cryogenic liquid storage apparatus of claim 2, wherein at least any one of the plurality of outer holder members is configured to move relative to the outer container in a direction toward or away from a center of the outer container.

4. The cryogenic liquid storage apparatus of claim 2, wherein the plurality of outer holder members comprise:

a movable outer holder member configured to move relative to the outer container in a direction toward or away from a center of the outer container, the movable outer holder member being configured to adjust tension of the support wire based on moving relative to the center of the outer container;

a first stationary outer holder member disposed at the outer container and spaced apart from the movable outer holder member in a clockwise direction about the axis of the inner container;

a second stationary outer holder member disposed at the outer container and spaced apart from the first stationary outer holder member in the clockwise direction; and a third stationary outer holder member disposed at the outer container and spaced apart from the second stationary outer holder member in the clockwise direction.

5. The cryogenic liquid storage apparatus of claim 4, wherein the movable outer holder member and the second stationary outer holder member are disposed on a first reference line crossing the axis of the inner container, and wherein the first stationary outer holder member and the third stationary outer holder member are disposed on a second reference line crossing the first reference line.

6. The cryogenic liquid storage apparatus of claim 5, wherein:

the movable outer holder member is disposed at a 12 o'clock position with respect to the axis of the inner container;

the first stationary outer holder member is disposed at a 3 o'clock position with respect to the axis of the inner container;

the second stationary outer holder member is disposed at a 6 o'clock position with respect to the axis of the inner container; and the third stationary outer holder member is disposed at a 9 o'clock position with respect to the axis of the inner container.

7. The cryogenic liquid storage apparatus of claim 4, comprising:

a holder mover configured to be disposed at the outer container and to move the movable outer holder member in the direction toward or away from the center of the outer container.

8. The cryogenic liquid storage apparatus of claim 7, wherein the holder mover comprises:

a fixing block configured to be fixed to the outer container, the fixing block having a through-hole; and an adjustment bolt configured to pass through the through-hole and to be fastened to a bolt hole defined in the movable outer holder member, and wherein the movable outer holder member is configured to be moved in the direction toward or away from the center of the outer container based on rotation of the adjustment bolt.

9. The cryogenic liquid storage apparatus of claim 2, wherein each of the plurality of outer holder members comprises:

an outer holder body that is disposed at the outer container and defines an outer holder accommodation portion accommodating the support wire.

10. The cryogenic liquid storage apparatus of claim 9, wherein the outer holder accommodation portion comprises an outer curved seating portion that is in contact with the support wire.

11. The cryogenic liquid storage apparatus of claim 1, wherein the inner container has a first quadrant region, a second quadrant region, a third quadrant region, and a fourth quadrant region that are defined about the axis of the inner container, and wherein the plurality of inner holder members comprise:

a first inner holder member disposed in the first quadrant region of the inner container;

a second inner holder member disposed in the second quadrant region of the inner container and spaced apart from the first inner holder member in a clockwise direction about the axis of the inner container;

a third inner holder member disposed in the third quadrant region of the inner container and spaced apart from the second inner holder member in the clockwise direction; and a fourth inner holder member disposed in the fourth quadrant region of the inner container and spaced apart from the third inner holder member in the clockwise direction.

12. The cryogenic liquid storage apparatus of claim 11, wherein the first inner holder member and the third inner holder member are symmetric with respect to the axis of the inner container, and wherein the second inner holder member and the fourth inner holder member are symmetric with respect to the axis of the inner container.

13. The cryogenic liquid storage apparatus of claim 1, wherein the inner holder is disposed at an end of the inner container, and wherein the outer holder is disposed at an end of the outer container facing the end of the inner holder.

14. A cryogenic liquid storage apparatus comprising:

an inner container configured to store a cryogenic liquid;

an inner holder disposed at the inner container;

an outer container that surrounds the inner container;

an outer holder disposed at the outer container; and a support wire that is a single body defining a closed-loop shape passing through the outer holder and the inner holder, the support wire being configured to support the inner container with respect to the outer container, wherein the inner holder comprises a plurality of inner holder members that are circumferentially spaced apart from one another and arranged about an axis of the inner container, wherein the support wire passes through the plurality of inner holder members and has a circular cross-section, wherein each of the plurality of inner holder members comprises an inner holder body that defines an inner holder accommodation portion accommodating the support wire, and wherein the inner holder accommodation portion comprises an inner curved seating portion that is in contact with the support wire and recessed from an inner surface of the inner holder body in a semicircular cross-sectional shape corresponding to a curvature of the support wire.

15. A cryogenic liquid storage apparatus comprising:

an inner container configured to store a cryogenic liquid;

an inner holder disposed at the inner container;

an outer container that surrounds the inner container;

an outer holder disposed at the outer container; and a support wire that is a single body defining a continuous closed-loop shape that continuously passes through the outer holder and the inner holder, the support wire being configured to support the inner container with respect to the outer container, wherein the outer holder comprises a plurality of outer holder members that are circumferentially spaced apart from one another and arranged about an axis of the inner container, wherein the support wire passes through the plurality of outer holder members, and wherein at least any one of the plurality of outer holder members is configured to move relative to the outer container in a direction toward or away from a center of the outer container.

* * * * *